United States Patent
Sun et al.

(10) Patent No.: US 10,454,798 B1
(45) Date of Patent: Oct. 22, 2019

(54) MULTI-USER DATA UNIT ARRIVAL TIME ADJUSTMENT

(71) Applicant: Marvell International Ltd., Hamilton (BM)

(72) Inventors: Yakun Sun, San Jose, CA (US); Hongyuan Zhang, Fremont, CA (US); Liwen Chu, San Ramon, CA (US); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 301 days.

(21) Appl. No.: 15/376,267

(22) Filed: Dec. 12, 2016

Related U.S. Application Data

(60) Provisional application No. 62/266,235, filed on Dec. 11, 2015.

(51) Int. Cl.
| | |
|---|---|
| *H04L 12/26* | (2006.01) |
| *H04L 12/841* | (2013.01) |
| *H04L 5/00* | (2006.01) |
| *H04L 12/18* | (2006.01) |

(52) U.S. Cl.
CPC ........ *H04L 43/0864* (2013.01); *H04L 5/0007* (2013.01); *H04L 12/18* (2013.01); *H04L 47/283* (2013.01)

(58) Field of Classification Search
CPC ... H04L 43/0864; H04L 12/18; H04L 47/283; H04L 5/0007
See application file for complete search history.

(56) References Cited

U.S. PATENT DOCUMENTS

| | | | |
|---|---|---|---|
| 9,166,660 B2 | 10/2015 | Chu et al. | |
| 2009/0196163 A1 | 8/2009 | Du | |
| 2009/0207771 A1* | 8/2009 | Lindskog | ............ H04L 12/1868 370/312 |

(Continued)

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

(Continued)

*Primary Examiner* — Ivan O Latorre

(57) ABSTRACT

A method for adjusting an arrival time of a first orthogonal frequency division multiplex (OFDM) data unit of an uplink multi-user (MU) data unit is described. Respective round trip times (RTTs) are determined by a first communication device for multiple communication devices that communicate with the first communication device. A first time offset for a second communication device of the multiple communication devices is determined by the first communication device based on the respective RTTs. The first OFDM data unit is to be transmitted by the second communication device. A first timing control message that indicates the first time offset is generated by the first communication device. The first timing control message is caused by the first communication device to be transmitted to the second communication device.

22 Claims, 6 Drawing Sheets

(56) References Cited

U.S. PATENT DOCUMENTS

| | | | |
|---|---|---|---|
| 2009/0245222 A1* | 10/2009 | Sampath | H04L 27/2607 370/343 |
| 2011/0087803 A1* | 4/2011 | Sun | H04J 3/0673 709/248 |
| 2011/0107169 A1* | 5/2011 | Lohr | H04W 72/042 714/748 |
| 2011/0261708 A1 | 10/2011 | Grandhi | |
| 2013/0229996 A1 | 9/2013 | Wang et al. | |
| 2014/0256347 A1* | 9/2014 | Lakhzouri | H04W 4/02 455/456.1 |
| 2016/0081027 A1* | 3/2016 | Ganesh | H04W 48/02 370/311 |
| 2016/0150500 A1* | 5/2016 | Agrawal | H04L 5/0007 370/329 |
| 2018/0041415 A1* | 2/2018 | Nitinawarat | H04L 5/0055 |
| 2018/0213424 A1* | 7/2018 | Du | H04W 24/00 |

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Van Nee et al. "The 802.11n MIMO-OFDM Standard for Wireless LAN and Beyond," Wireless Personal Communications, vol. 37, pp. 445-453 (Jun. 2006).

* cited by examiner

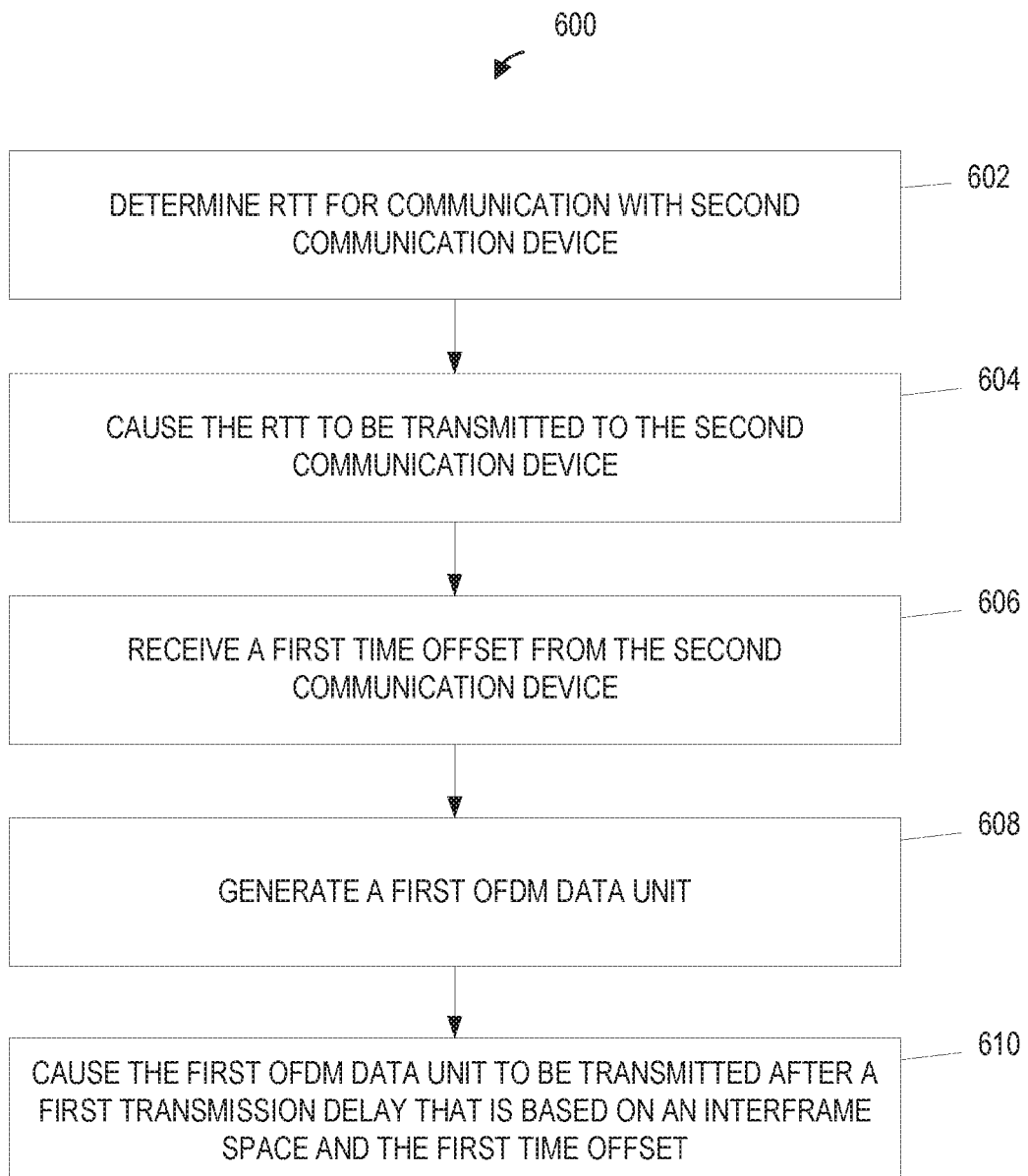

MULTI-USER DATA UNIT ARRIVAL TIME ADJUSTMENT

CROSS-REFERENCES TO RELATED APPLICATIONS

This disclosure claims the benefit of U.S. Provisional Patent Application No. 62/266,235, entitled "Time Advanced Control for Uplink Multi-User Transmission" and filed on Dec. 11, 2015, the disclosure of which is incorporated herein by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technologies is described in detail in the Institute of Electrical and Electronics Engineers (IEEE) 802.11 Standards, including for example, the IEEE Standards 802.11a/b/g, 802.11n, and 802.11ac and their updates and amendments, as well as the IEEE Standard 802.11ax now in the process of being adopted, all of which are collectively incorporated herein fully by reference. These standards and draft standards specify various methods of establishing connections between wireless devices. For example, in an infrastructure mode, wireless devices must first connect with a wireless access point and all communications occur via the access point. On the other hand, in an ad hoc mode, wireless devices can connect and communicate with each other directly, as opposed to communicating via an access point.

SUMMARY

In an embodiment, a method for adjusting an arrival time of a first orthogonal frequency division multiplex (OFDM) data unit of an uplink multi-user (MU) data unit includes determining, by a first communication device, respective round trip times (RTTs) for multiple communication devices that communicate with the first communication device. The method also includes determining, by the first communication device, a first time offset for a second communication device of the multiple communication devices based on the respective RTTs. The first OFDM data unit is to be transmitted by the second communication device. The method includes generating, by the first communication device, a first timing control message that indicates the first time offset. The method also includes causing, by the first communication device, the first timing control message to be transmitted to the second communication device.

In another embodiment, a first communication device for adjusting an arrival time of a first orthogonal frequency division multiplex (OFDM) data unit of an uplink multi-user (MU) data unit includes a network interface device having one or more integrated circuits. The one or more integrated circuits are configured to determine respective round trip times (RTTs) for multiple communication devices that communicate with the first communication device. The one or more integrated circuits are configured to determine a first time offset for a second communication device of the multiple communication devices based on the respective RTTs. The first OFDM data unit is to be transmitted by the second communication device. The one or more integrated circuits are also configured to generate a first timing control message that indicates the first time offset. The one or more integrated circuits are configured to cause the first timing control message to be transmitted to the second communication device.

In an embodiment, a method for adjusting an arrival time of a first orthogonal frequency division multiplex (OFDM) data unit of an uplink multi-user (MU) data unit includes determining, by a first communication device, a round trip time (RTT) for communications with a second communication device. The method also includes causing, by the first communication device, the RTT to be transmitted to the second communication device. The method includes receiving, by the first communication device and from the second communication device, a first time offset that is based on the RTT. The method includes generating, by the first communication device, the first OFDM data unit. The method also includes causing, by the first communication device, the first OFDM data unit to be transmitted to the second communication device after a first transmission delay that is based on i) an interframe space associated with the first OFDM data unit, and ii) the first time offset.

In another embodiment, a first communication device for adjusting an arrival time of a first orthogonal frequency division multiplex (OFDM) data unit of an uplink multi-user (MU) data unit includes a network interface device having one or more integrated circuits. The one or more integrated circuits are configured to determine a round trip time (RTT) for communications with a second communication device. The one or more integrated circuits are configured to cause the RTT to be transmitted to the second communication device. The one or more integrated circuits are also configured to receive, from the second communication device, a first time offset that is based on the RTT. The one or more integrated circuits are configured to generate the first OFDM data unit. The one or more integrated circuits are also configured to cause the first OFDM data unit to be transmitted to the second communication device after a first transmission delay that is based on i) an interframe space associated with the first OFDM data unit, and ii) the first time offset.

BRIEF DESCRIPTION OF THE DRAWINGS

FIG. 6 is a flow diagram of another example method for adjusting an arrival time of a first OFDM data unit of an uplink multi-user data unit, according to an embodiment.

DETAILED DESCRIPTION

In embodiments described below, a wireless network device such as an access point (AP) of a wireless local area network (WLAN) simultaneously receives independent data streams simultaneously transmitted by multiple client stations. For example, multiple client stations transmit data to the AP simultaneously, in particular, each client station transmits data in a different OFDM sub-channel of an OFDMA transmission, in an embodiment. In another embodiment, multiple client stations transmit data to the AP simultaneously using different spatial streams within a MU-MIMO transmission to the AP. In some scenarios, at least some of the multiple client stations have different round trip times (RTTs) for data units transmitted between the client station and the AP, which results in different arrival times for some OFDM data units of an OFDMA transmission (or, some OFDM data units of a MU-MIMO transmission).

In an embodiment, a first communication device (e.g., the AP) determines respective RTTs for multiple communication devices (e.g., multiple client stations). The first communication device determines a first time offset for a second communication device of the multiple communication devices. The first communication device generates a first timing control message that indicates the first time offset and causes the first timing control message to be transmitted to the second communication device. In some scenarios, the second communication device transmits a first OFDM data unit, as a portion of an uplink OFDMA transmission or uplink MU-M IMO transmission, after a first transmission delay that is based on the first time offset. In some scenarios, the first time offset adjusts the arrival time of the first OFDM data unit and reduces an overall difference in arrival times for data units of the uplink multi-user transmission.

Figure 1:
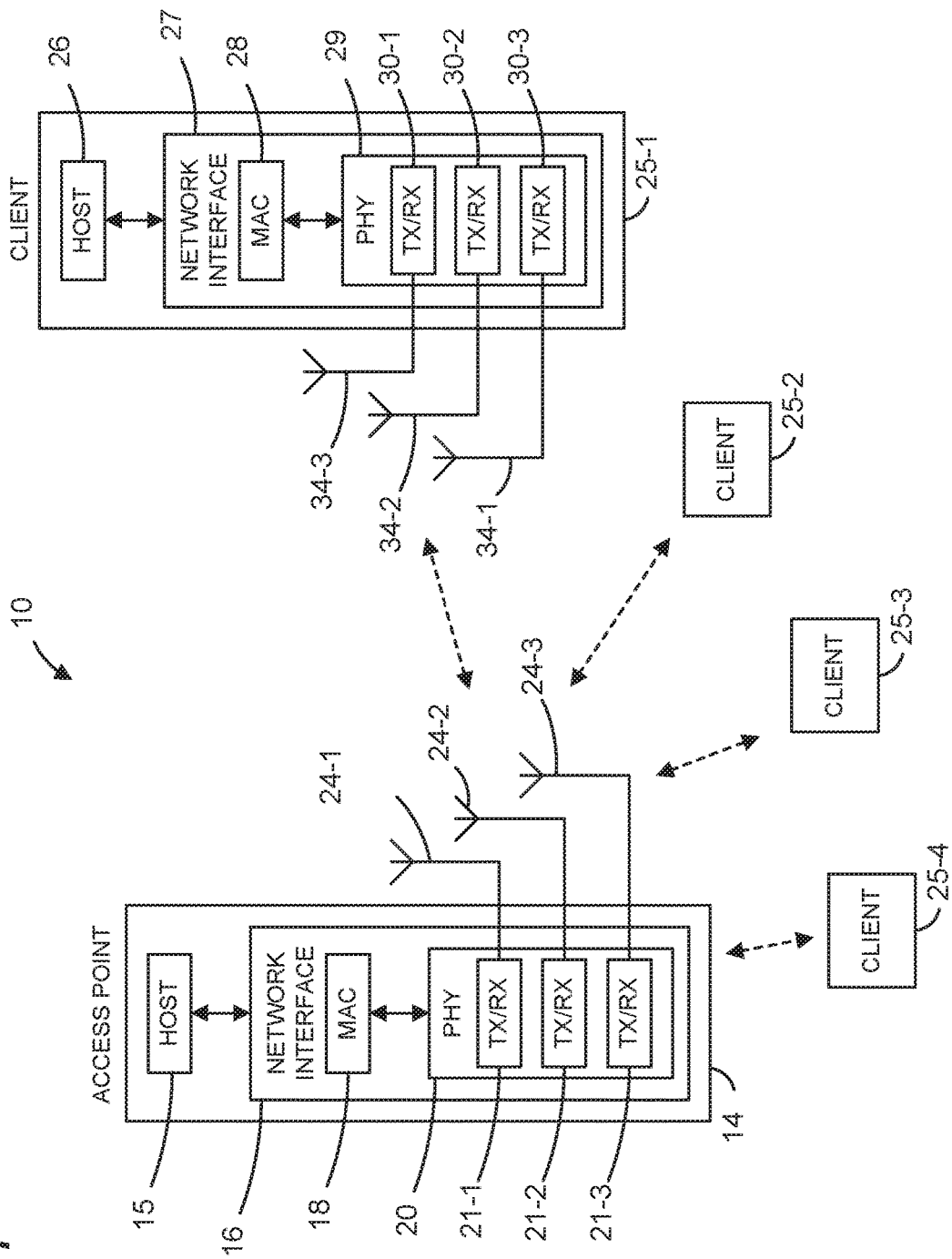
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 or another communication device (not shown) is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-3 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client station 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client station 25-1 are configured to process received data units conforming to the first communication protocol and having formats described hereinafter and to determine that such data units conform to the first communication protocol, according to various embodiments.

Figure 2:
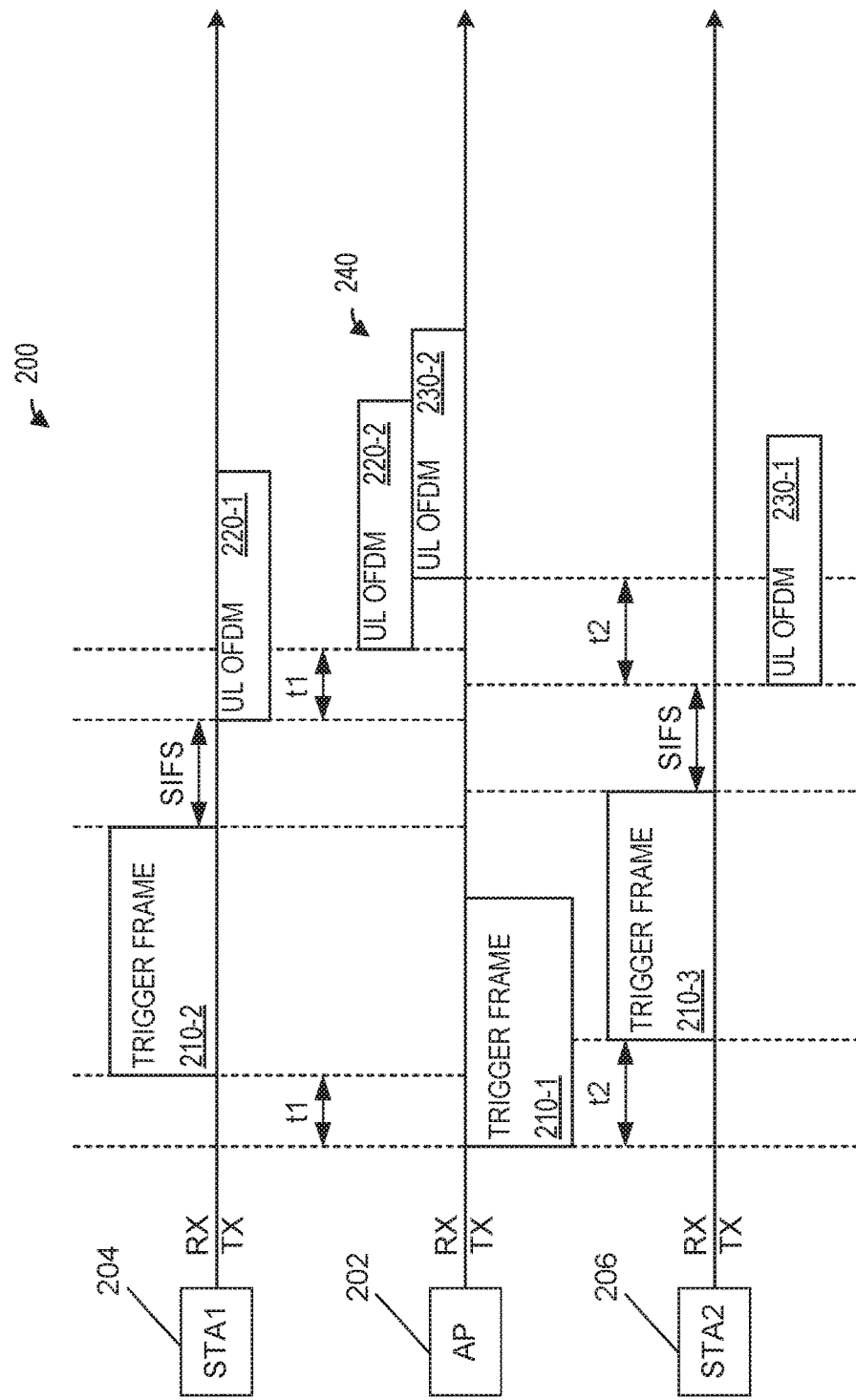
FIG. 2 is a diagram of an example frame exchange for a multi-user uplink transmission, according to an embodiment.

FIG. 2 is a diagram of an example frame exchange 200 for a multi-user uplink transmission, according to an embodiment. In the embodiment shown in FIG. 2, the frame exchange 200 is performed between an AP 202 and multiple client stations, including client stations 204 (STA1) and 206 (STA2). In an embodiment, the AP 202 generally corresponds to the AP 14 and the client stations 204 and 206 generally correspond to the client stations 25. In other embodiments, the AP 202 and client stations 204 and 206 correspond to other suitable communication devices. In an embodiment, the multiple client stations include all client stations currently associated with the AP 202. In another embodiment, the multiple client stations include a multi-user group identified by the AP 202 (e.g., a MU-MIMO group or OFDMA group). In yet another embodiment, the multiple client stations includes only a subset of the client stations currently associated with the AP 202 or only a subset of a multi-user group.

In some embodiments, the AP 202 simultaneously receives independent data streams (e.g., data units) simultaneously transmitted by the multiple client stations 204 and 206. In an embodiment, for example, the multiple client stations 204 and 206 transmit data units to the AP 202 simultaneously, and in particular, each of the multiple client stations transmits a data unit in a different OFDM subchannel of an OFDMA transmission, in an embodiment. In another embodiment, the multiple client stations 204 and 206 transmit respective data units to the AP 202 simultaneously using different spatial streams within a MU-MIMO transmission to the AP 202.

The AP 202 causes a request for uplink multi-user data units from the multiple client stations to be transmitted to the multiple client stations, in various embodiments and/or scenarios. In the embodiment shown in FIG. 2, the request is a trigger frame 210 transmitted by the AP 202 to the multiple client stations. In other embodiments and/or scenarios, the request is a scheduling frame, SYNC frame, or other suitable message. In some scenarios, at least some of the multiple client stations 204 and 206 have different round trip times (RTTs) for data units exchanged between the client stations and the AP 202, which results in different arrival times for some OFDM data units of an OFDMA transmission (or, some OFDM data units of a MU-MIMO transmission). The different round trip times are generally based on one or more factors, for example, distance between the AP 202 and the client station (and thus, travel time for the signal), processing speed, clock signal consistency, or other factors. In the embodiment shown in FIG. 2, the AP 202 transmits the trigger frame 210-1, which is received at the client station 204 (trigger frame 210-2) after a propagation delay t1 and is received at the client station 206 (trigger frame 210-3) after a propagation delay t2, where t2 is larger than t1.

In the embodiment shown in FIG. 2, the trigger frame 210 includes a request for the multiple client stations 204 and 206 to transmit respective OFDM data units 220 and 230 of an OFDMA data unit 240 after a short interframe space (SIFS) period following receipt of the trigger frame 210. In other embodiments and/or scenarios, a different interframe space (IFS) is utilized instead of the SIFS. In still other embodiments and/or scenarios, the trigger frame 210 indicates a scheduled time at which the multiple client stations should transmit the OFDM data units 220 and 230. In an embodiment, the client station 204 generates and transmits the OFDM data unit 220-1 after the SIFS period following receipt of the trigger frame 210-2 and thus the AP 202 receives the OFDM data unit 220-2 after the propagation delay t1 following transmission of the OFDM data unit 220-1. Similarly, the client station 206 generates and transmits the OFDM data unit 230-1 after the SIFS period following receipt of the trigger frame 210-3 and thus the AP 202 receives the OFDM data unit 230-2 after the propagation delay t2 following transmission of the OFDM data unit 230-1.

Both client stations 204 and 206 generate and transmit their respective OFDM data units 220 and 230 after the SIFS period following receipt of the corresponding received trigger frame 210, but due to the different propagation delays t1 and t2, the OFDM data units 220-2 and 230-3 are received with different arrival times, in the embodiment shown in FIG. 2. In some embodiments and/or scenarios, additional jitter delays (not shown), for example, clock inconsistencies, affect the transmission time and thus the arrival times of the OFDM data units 220-2 and 230-2. In an embodiment, an estimated time offset T between the OFDM data units 220-2 and 230-2 is equal to:

$$T=RTT(STA2)-RTT(STA1)+Jitter$$

where RTT(STA2) is the round trip time for client station 206 (e.g., 2*t2), RTT(STA1) is the round trip time for client station 204 (e.g., 2*t1), and Jitter is a total jitter delay between the client stations 204 and 206. The time offset generally corresponds to a duration of time that separates the OFDM data units 220 and 230 from being synchronized. In various embodiments and/or scenarios, the AP 202 determines a first time offset to be provided to one or more of the multiple client stations to reduce the time offset and improve synchronization and reliable reception of the uplink OFDM data units 220 and 230. In some embodiments, the AP 202 determines a time offset that allows for arrival of OFDM data units of an uplink multi-user data unit within a suitably small time difference, for example, within a guard interval duration.

Figure 3:
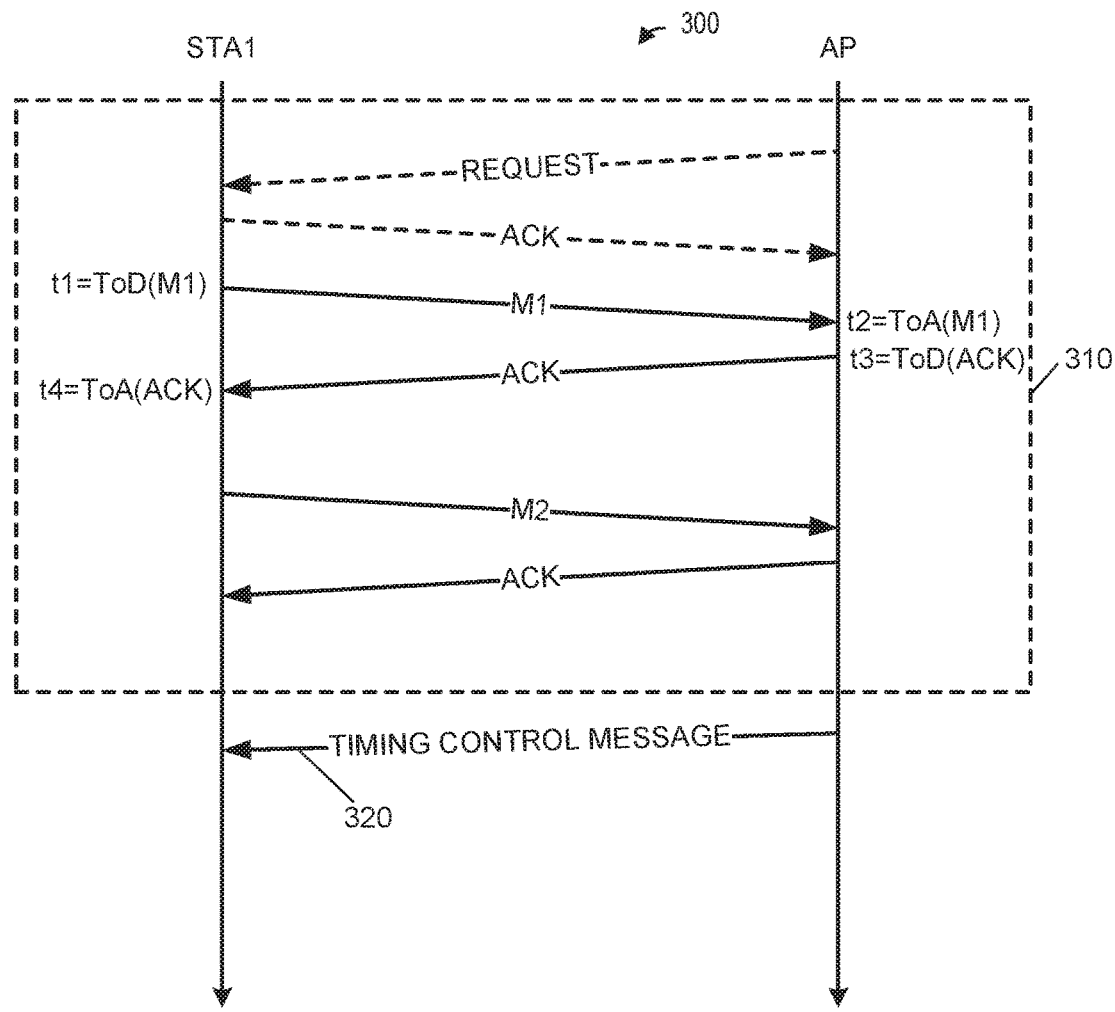
FIG. 3 is a diagram of an example frame exchange between an access point and a client station to determine a first time offset, according to an embodiment.

FIG. 3 is a diagram of an example frame exchange 300 between an access point and a client station to determine a first time offset, according to an embodiment. In various embodiments and/or scenarios, the AP 202 determines respective round trip times for the multiple client stations 204 and 206 utilizing one or more timing measurement procedures 310, for example, a timing measurement procedure as described in the IEEE 802.11 Standard (incorporated herein by reference in its entirety), a timing measurement procedure as described in the Fine Timing Measurement (FTM) protocol of the IEEE 802.11REVmc draft standard (e.g., as a portion of a location service), a timing measurement procedure as described in the FTM protocol of the IEEE 802.11az draft standard, or other suitable frame exchanges for RTT measurements. In the embodiment shown in FIG. 3, the AP 202 initiates a timing measurement procedure 310 that generally corresponds to the timing measurement procedure described in the IEEE 802.11 Standard (see Section 10.23.5). In this embodiment, the AP 202 is a receiving station and the client station 204 (or client station 206) is a transmitting station, and thus the AP 202 i) receives a time of departure t1 of an action frame M1 from the client station 204 (via action frame M2), ii) determines a time of arrival t1 of the action frame M1, iii) determines a time of departure t3 of an acknowledgment frame ACK, and iv) receives a time of arrival t4 of the acknowledgment frame ACK (via action frame M2). In an embodiment, the AP 202 determines the RTT as ((t2−t1)−(t4−t3))/2.

In various embodiments and/or scenarios, the AP 202 initiates centralized timing measurement procedures 310 for the multiple client stations. In some embodiments, a client station initiates the timing measurement procedure of the FTM protocol (e.g., for location determination), determines its RTT, and then sends the RTT to the AP 202 in a suitable control frame. In other embodiments and/or scenarios, the AP 202 sends a request to perform the timing measurement procedure of the FTM protocol to the client stations. In one such embodiment, the AP 202 sequentially initiates the timing measurement procedures for the multiple client stations. In other words, the AP 202 waits until a first timing measurement procedure for a first client station is complete before initiating a second timing measurement procedure for a second client station. In another embodiment, the AP 202 initiates the timing measurement procedures as needed for the client stations. In some embodiments and/or scenarios, the AP 202 sends a request to initiate timing measurement procedures for only a subset of the client stations, for example, for an uplink transmission group selected from client stations associated with the AP 202. In an embodiment, the AP 202 sequentially initiates the timing measurement procedures for the subset of client stations, as described above. In another embodiment, the AP 202 generates and transmits a downlink multi-user frame that includes the request to initiate timing measurement procedures. In yet another embodiment, the AP 202 generates and transmits a multicast frame, a multi-user OFDMA frame, a MU-MIMO frame, or other suitable frame to the subset of client stations to initiate the timing measurement procedures.

The AP 202 determines one or more time offsets for the multiple client stations, in various embodiments and/or scenarios. In an embodiment, the AP 202 determines a first time offset for the client station 204 and sends the first time offset to the client station 204, for example, in a timing control message 320 (e.g., a control frame, management frame, or other suitable frame). In some embodiments and/or scenarios, the AP 202 determines respective time offsets for each of the multiple client stations and sends the respective time offsets to the corresponding client station in respective timing control message 320. In an embodiment, for example, the AP 202 performs a separate instance of the frame exchange 300 for each of the multiple client stations. In another embodiment and/or scenario, the AP 202 utilizes different timing measurement procedures for different client stations, for example, where the client stations support different timing measurement procedures. In some embodiments and/or scenarios, the AP 202 determines respective time offsets for only a subset of the multiple client stations. In an embodiment, for example, the AP 202 determines respective time offsets only for client stations to be scheduled for an uplink multi-user data unit. In another embodiment, the AP 202 identifies a first client station of multiple client stations as a "base" client station and determines respective time offsets for the remaining multiple client stations.

The AP 202 provides the time offsets in the timing control messages 320 to the client stations for long term time offset control, short term (e.g., instantaneous) time offset control, differential time offset control, or a combination thereof, in various embodiments and/or scenarios. In some embodiments, the AP 202 utilizes long term time offset control for the client station 204 and sends the determined time offset to the client station 204 for a plurality of subsequent uplink messages. In various embodiments, the timing control message 320 indicates a time duration during which the client station 204 should utilize the time offset, a number of uplink frames for which the client station 204 should utilize the time offset, or that the client station 204 should utilize the time offset until further notice. In some embodiments, the AP 202 utilizes short term time offset control for the client station 204 and sends the determined time offset to the client station 204 for a subsequent transmission. In one such embodiment, the client station 204 utilizes the time offset for only a next OFDM data unit (e.g., a triggered data unit) transmitted by the client station 204 to the AP 202. In some embodiments, the AP 202 utilizes differential time offset control for the multiple client stations. For differential time offset control, a subsequent time offset is added to or combined with a previous time offset.

Figure 4:
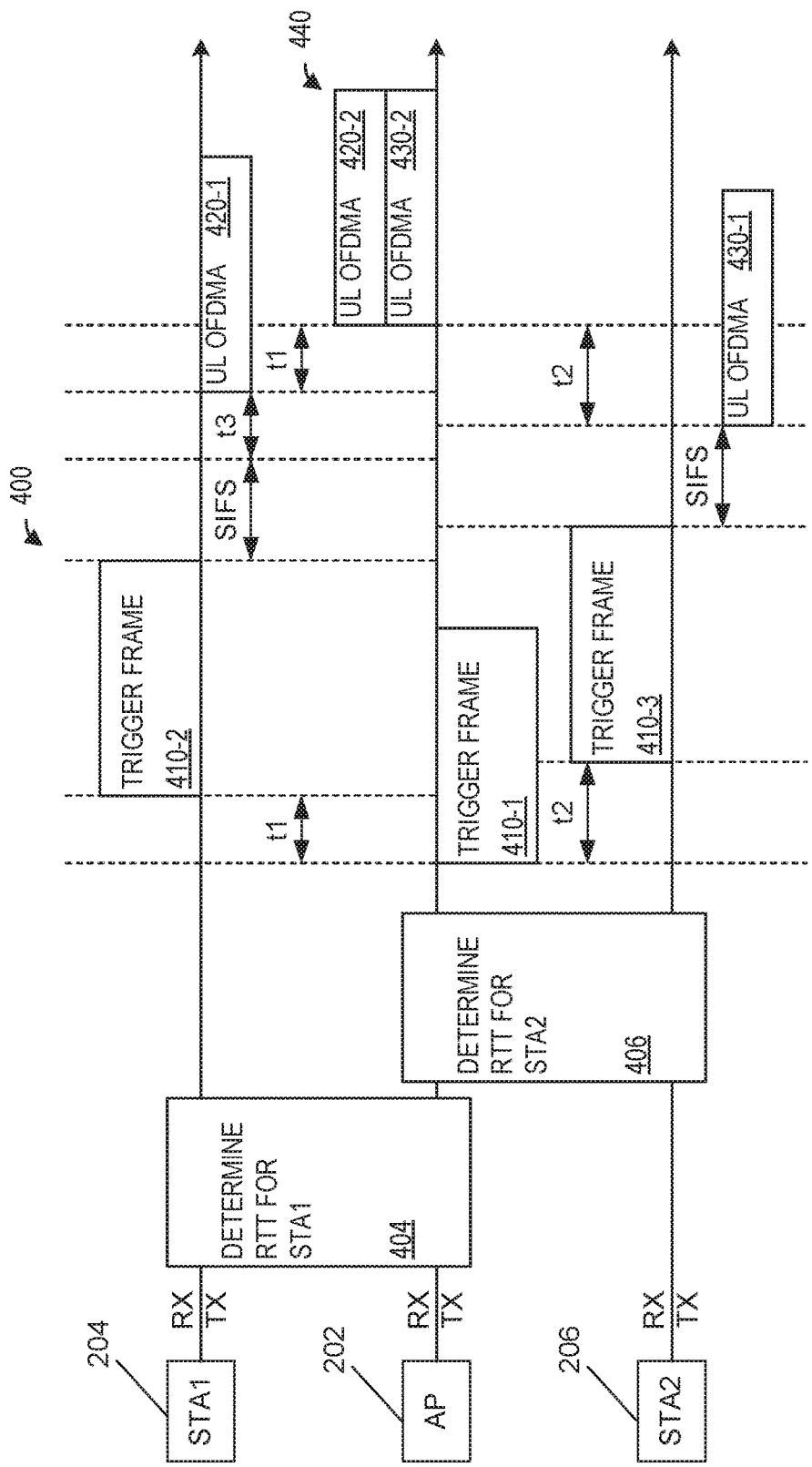
FIG. 4 is a diagram of an example frame exchange for a multi-user uplink transmission, according to an embodiment.

FIG. 4 is a diagram of an example frame exchange 400 for a multi-user uplink transmission, according to an embodiment. In the embodiment shown in FIG. 4, the AP 202 determines respective RTTs for multiple client stations 204 and 206, for example, by performing a frame exchange 404 with the client station 204 and performing a frame exchange 406 with the client station 206. In an embodiment, one or both of the frame exchanges 404 and 406 correspond to the frame exchange 300, as described above.

In the embodiment shown in FIG. 4, the AP 202 determines a first time offset t3 for the client station 204 and a zero offset for the client station 206. In other words, the client station 206 is the base client station from which the first time offset is determined. In a similar manner as that described above with respect to FIG. 2, the AP 202 generates and transmits a trigger frame 410-1, which is received at the client station 204 (trigger frame 410-2) after the propagation delay t1 and is received at the client station 206 (trigger frame 410-3) after the propagation delay t2. The trigger frame 410 includes i) an indication of the first time offset t3 for the client station 204, and ii) a request for the multiple client stations 204 and 206 to transmit respective OFDM data units 420 and 430 of an OFDMA data unit 440 after a short interframe space (SIFS) period following receipt of the trigger frame 410, in an embodiment.

The client station 206 generates and transmits the OFDM data unit 430-1 after the SIFS period following receipt of the trigger frame 410-3, in the illustrated embodiment. The client station 204 generates and transmits the OFDM data unit 420-1 after the SIFS period and the first time offset t3 following receipt of the trigger frame 410-2. In other words, the client station 204 transmits the OFDM data unit 420-1 after a first transmission delay that is based on i) an interframe space (e.g., SIFS) associated with the first OFDM data unit, and ii) the first time offset t3. By transmitting after the first transmission delay, the OFDM data units 420-2 and 430-3 arrive at the AP 202 within a suitable time period of each other (e.g., a reduced time period or at substantially the same time).

Figure 5:
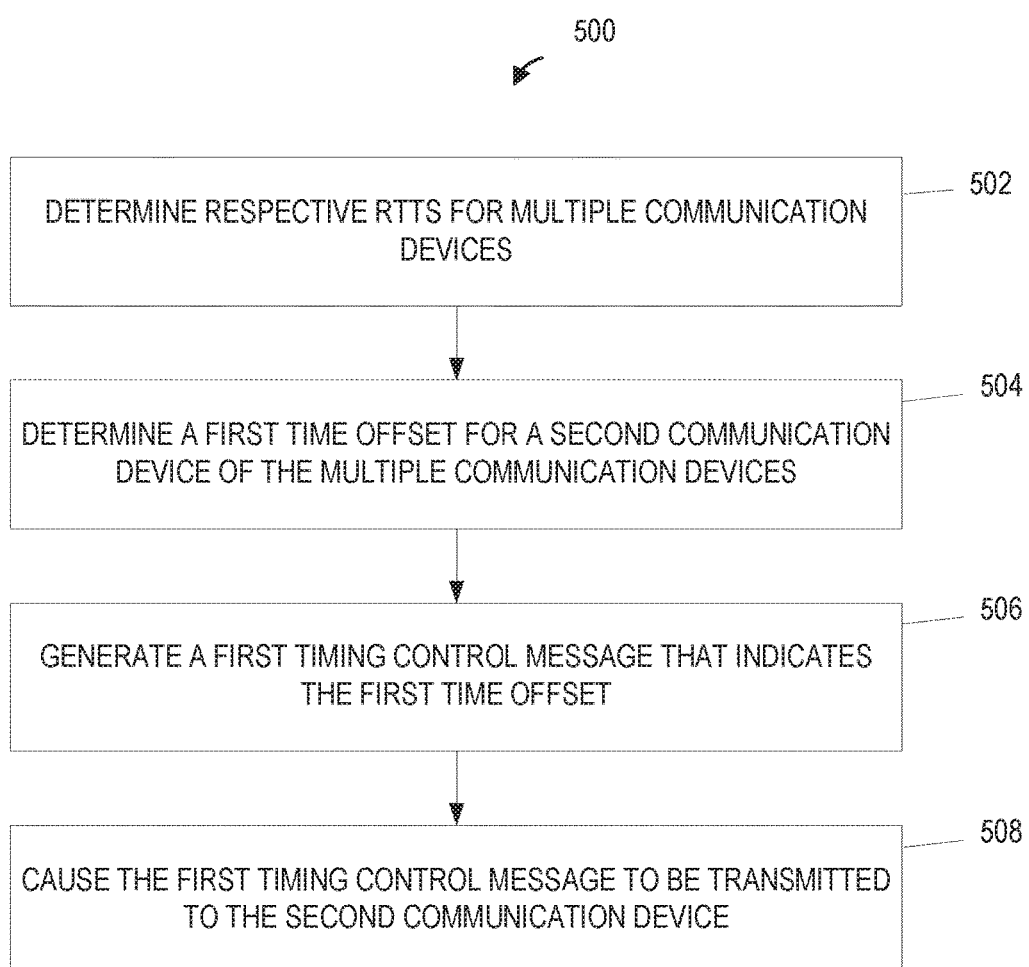
FIG. 5 is a flow diagram of an example method for adjusting an arrival time of a first orthogonal frequency division multiplex (OFDM) data unit of an uplink multi-user data unit, according to an embodiment.

FIG. 5 is a flow diagram of an example method 500 for adjusting an arrival time of a first orthogonal frequency division multiplex (OFDM) data unit of an uplink multi-user data unit, according to an embodiment. In an embodiment, the method 500 is implemented by a client station in the WLAN, according to an embodiment. With reference to FIG. 1, the method 500 is implemented by the network interface 27, in an embodiment. For example, in one such embodiment, the PHY processor 29 is configured to implement the method 500. According to another embodiment, the MAC processing 28 is also configured to implement at least a part of the method 500. With continued reference to FIG. 1, in yet another embodiment, the method 500 is implemented by the network interface 16 (e.g., the PHY processor 20 and/or the MAC processor 18). In other embodiments, the method 500 is implemented by other suitable network interfaces.

At block 502, respective round trip times (RTTs) are determined by a first communication device for multiple communication devices that communicate with the first communication device, in an embodiment. The first communication device is the AP 202 and the multiple communication devices include the client stations 204 and 206, in an embodiment.

At block 504, a first time offset is determined by the first communication device for a second communication device of the multiple communication devices based on the respective RTTs, in an embodiment. The first OFDM data unit is to be transmitted by the second communication device, in an embodiment. The second communication device corresponds to the client station 204 according to the scenario described above with respect to FIG. 4, in an embodiment.

At block 506, a first timing control message that indicates the first time offset is generated by the first communication device, in an embodiment. In an embodiment, the first timing control message corresponds to the timing control message 320. In another embodiment, the first timing control message corresponds to the trigger frame 410.

At block 508, the first timing control message is caused to be transmitted to the second communication device.

FIG. 6 is a flow diagram of another example method 600 for adjusting an arrival time of a first OFDM data unit of an uplink multi-user data unit, according to an embodiment. In an embodiment, the method 600 is implemented by a client station in the WLAN, according to an embodiment. With reference to FIG. 1, the method 600 is implemented by the network interface 27, in an embodiment. For example, in one such embodiment, the PHY processor 29 is configured to implement the method 600. According to another embodiment, the MAC processing 28 is also configured to implement at least a part of the method 600. With continued reference to FIG. 1, in yet another embodiment, the method 600 is implemented by the network interface 16 (e.g., the PHY processor 20 and/or the MAC processor 18). In other embodiments, the method 600 is implemented by other suitable network interfaces.

At block 602, a first communication device determines a round trip time (RTT) for communications with a second communication device, in an embodiment. The first communication device corresponds to the client station 204 and the second communication device corresponds to the AP 202 as described above with respect to FIG. 4, in an embodiment. In an embodiment, for example, the first communication device performs the timing measurement procedure 310 (e.g., a fine timing measurement procedure).

At block 604, the first communication device causes the RTT to be transmitted to the second communication device, in an embodiment. The first communication device generates a control frame, management frame, or other suitable frame that indicates the RTT, in an embodiment.

At block 606, a first time offset that is based on the RTT is received by the first communication device from the second communication device, in an embodiment.

At block 608, the first OFDM data unit is generated by the first communication device, in an embodiment. In an embodiment, for example, the first communication device generates the OFDM data unit 420-1.

At block 610, the first communication device causes the first OFDM data unit to be transmitted to the second communication device after a first transmission delay that is based on i) an interframe space associated with the first OFDM data unit, and ii) the first time offset, in an embodiment. The first transmission delay is based on the SIFS period and the first time offset, as described above with respect to FIG. 4, in an embodiment. In other words, the first transmission delay is equal to the sum of the SIFS period and the time offset t3.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for adjusting an arrival time of a first orthogonal frequency division multiplex (OFDM) data unit of an uplink multi-user (MU) data unit, the method comprising:
   determining, by a first communication device, respective round trip times (RTTs) for multiple communication devices that communicate with the first communication device;
   determining, by the first communication device, a first time offset for a second communication device of the multiple communication devices based on the respective RTTs, wherein the first OFDM data unit is to be transmitted by the second communication device using the first time offset, the first time offset being determined so that the first OFDM data unit and a second OFDM data unit of the uplink MU data unit have a substantially same arrival time at the first communication device, the second OFDM data unit being transmitted by a third communication device of the multiple communication devices;
   generating, by the first communication device, a first timing control message that indicates the first time offset; and
   causing, by the first communication device, the first timing control message to be transmitted to the second communication device.

2. The method of claim 1, wherein the method further comprises:
   causing, by the first communication device, a trigger frame to be transmitted to the multiple communication devices; and
   receiving, by the first communication device, the uplink MU data unit;
   wherein:
      the uplink MU data unit includes i) the first OFDM data unit transmitted by the second communication device using the first time offset, and ii) the second OFDM data unit transmitted by the third communication device; and the first time offset is determined so that the arrival time of the first OFDM data unit and an arrival time of the second OFDM data unit are within a guard interval duration.

3. The method of claim 1, wherein the method further comprises:
   determining, by the first communication device, a second time offset for the second communication device based on the first time offset, wherein the second time offset is a differential offset to be combined with the first time offset;
   generating, by the first communication device, a second timing control message that indicates the second time offset; and
   causing, by the first communication device, the second timing control message to be transmitted to the second communication device.

4. The method of claim 1, wherein determining the respective RTTs for the multiple communication devices comprises receiving respective control frames that include the respective RTTs from the multiple communication devices.

5. The method of claim 4, wherein determining the respective RTTs for the multiple communication devices further comprises sequentially requesting a next control frame of the respective control frames from a corresponding communication device of the multiple communication devices in response to receipt of a previous control frame of the respective control frames.

6. The method of claim 4, wherein:
   the uplink MU data unit includes OFDM data units from a plurality of communication devices; and
   the multiple communication devices are a subset of the plurality of communication devices.

7. The method of claim 6, wherein determining the respective RTTs for the multiple communication devices further comprises:
   generating a downlink MU data unit that indicates a request for the respective control frames that include the respective RTTs from the multiple communication devices; and
   causing the downlink MU data unit to be transmitted to the multiple communication devices.

8. The method of claim 6, wherein the downlink MU data unit is a multicast frame that indicates the request.

9. A first communication device for adjusting an arrival time of a first orthogonal frequency division multiplex (OFDM) data unit of an uplink multi-user (MU) data unit, the first communication device comprising:
   a network interface device having one or more integrated circuits configured to
      determine respective round trip times (RTTs) for multiple communication devices that communicate with the first communication device,
      determine a first time offset for a second communication device of the multiple communication devices based on the respective RTTs, wherein the first OFDM data unit is to be transmitted by the second communication device using the first time offset, the first time offset being determined so that the first OFDM data unit and a second OFDM data unit of the uplink MU data unit have a substantially same arrival time at the first communication device, the second OFDM data unit being transmitted by a third communication device of the multiple communication devices, generate a first timing control message that indicates the first time offset, and cause the first timing control message to be transmitted to the second communication device.

10. The first communication device of claim 9, wherein: the one or more integrated circuits are configured to:

cause a trigger frame to be transmitted to the multiple communication devices, and receive the uplink MU data unit;

the uplink MU data unit includes i) the first OFDM data unit transmitted by the second communication device using the first time offset in response to the trigger frame, and ii) the second OFDM data unit transmitted by the third communication device in response to the trigger frame; and the first time offset is determined so that the arrival time of the first OFDM data unit and an arrival time of the second OFDM data unit are within a guard interval duration.

11. The first communication device of claim 9, wherein the one or more integrated circuits are configured to:

determine a second time offset for the second communication device based on the first time offset, wherein the second time offset is a differential offset to be combined with the first time offset;

generate a second timing control message that indicates the second time offset; and cause the second timing control message to be transmitted to the second communication device.

12. The first communication device of claim 9, wherein the one or more integrated circuits are configured to receive respective control frames that include the respective RTTs from the multiple communication devices.

13. A method for adjusting an arrival time of a first orthogonal frequency division multiplex (OFDM) data unit of an uplink multi-user (MU) data unit, the method comprising:

determining, by a first communication device, a round trip time (RTT) for communications with a second communication device;

causing, by the first communication device, the RTT to be transmitted to the second communication device;

receiving, by the first communication device and from the second communication device, a first time offset that is based on the RTT;

generating, by the first communication device, the first OFDM data unit; and causing, by the first communication device, the first OFDM data unit to be transmitted to the second communication device after a first transmission delay that is based on i) an interframe space associated with the first OFDM data unit, and ii) the first time offset, so that the first OFDM data unit and a second OFDM data unit of the uplink MU data unit have a substantially same arrival time at the second communication device, the second OFDM data unit being transmitted by a third communication device.

14. The method of claim 13, wherein the method further comprises:

receiving, by the first communication device and from the second communication device, a first trigger frame that indicates a request to transmit the first OFDM data unit; and determining the transmission delay to start at an end of the trigger frame and to include a sum of the interframe space and the first time offset.

15. The method of claim 13, wherein the method further comprises:

receiving, by the first communication device and from the second communication device, a first trigger frame that indicates a request to transmit a second OFDM data unit;

receiving a second time offset that is a differential offset to be combined with the first time offset; and determining a second transmission delay to start at an end of the second trigger frame and to include a sum of the first transmission delay and the second time offset.

16. The method of claim 13, wherein the method further comprises receiving, by the first communication device and from the second communication device, a multicast frame that includes a request to determine the RTT for communications with the second communication device.

17. The method of claim 13, wherein causing the first OFDM data unit to be transmitted to the second communication device includes causing the first OFDM data unit to be transmitted as a portion of a multiple user, orthogonal frequency division multiple access (MU-OFDMA) data unit.

18. The method of claim 13, wherein causing the first OFDM data unit to be transmitted to the second communication device includes causing the first OFDM data unit to be transmitted as a portion of a multiple user, multiple input multiple output (MU-MIMO) data unit.

19. A first communication device for adjusting an arrival time of a first orthogonal frequency division multiplex (OFDM) data unit of an uplink multi-user (MU) data unit, the first communication device comprising:

a network interface device having one or more integrated circuits configured to determine a round trip time (RTT) for communications with a second communication device, cause the RTT to be transmitted to the second communication device, receive, from the second communication device, a first time offset that is based on the RTT, generate the first OFDM data unit, and cause the first OFDM data unit to be transmitted to the second communication device after a first transmission delay that is based on i) an interframe space associated with the first OFDM data unit, and ii) the first time offset, so that the first OFDM data unit and a second OFDM data unit of the uplink MU data unit have a substantially same arrival time at the second communication device, the second OFDM data unit being transmitted by a third communication device.

20. The first communication device of claim 19, wherein the one or more integrated circuits are configured to:

receive, from the second communication device, a first trigger frame that indicates a request to transmit the first OFDM data unit; and determine the transmission delay to start at an end of the trigger frame and to include a sum of the interframe space and the first time offset.

21. The first communication device of claim 19, wherein the one or more integrated circuits are configured to:

receive, from the second communication device, a first trigger frame that indicates a request to transmit a second OFDM data unit;

receive, from the second communication device, a second time offset that is a differential offset to be combined with the first time offset; and determine a second transmission delay to start at an end of the second trigger frame and to include a sum of the first transmission delay and the second time offset.

22. The first communication device of claim 19, wherein the one or more integrated circuits are configured to receive, from the second communication device, a multicast frame that includes a request to determine the RTT for communications with the second communication device.

* * * * *